Patented Dec. 8, 1953

2,662,064

UNITED STATES PATENT OFFICE 2,662,064

DECORATIVE WALL SURFACING MATERIAL

George H. Mead, Detroit, Mich., assignor to Minnesota Mining & Manufacturing Company, St. Paul, Minn., a corporation of Delaware No Drawing. Application January 12, 1949, Serial No. 70,607

2 Claims. (Cl. 260—17)

My invention relates to the art of decorative wall surfacing material and to the surfaces made therewith. It particularly concerns a composition comprising a hydraulic-setting inorganic cement and a fibrous filler, gaged with (i. e. mixed to a desired consistency with) an aqueous emulsion of a plastic organic material.

My composition is of such character that it can be applied to the desired surfaces over a period of two or three hours or so after the ingredients thereof have been mixed together to provide the fluid composition. It is also of such character that it has a very considerable specific adhesion to metal, wood, concrete and various other surfaces and, by way of contrast with ordinary plaster, does not simply depend upon mechanical adhesion, such as illustrated by plaster which mechanically locks itself around laths. I am aware that heretofore others have produced compositions which involve a mixture of a hydraulic-setting cement and a plastic material such as asphalt, for use for example in patching old floors or in covering old concrete floors to provide a new floor surfacing. However, to my knowledge, such materials were neither used, nor suitable, for providing decorative wall surfacing.

I am also aware that heretofore it has been suggested to use a mixture of white Portland cement, coarse round silica sand and clay, plus pigments, as a wall surfacing. Such a composition, however, is very lacking in specific adhesion and, like ordinary plaster, depends upon mechanical bonding to hold it to the applied surface. Such a material is commonly applied over rough stucco or the like, where large indentations and crevices are present which permit mechanical bonding. If it is desired to apply such a material over a relatively smooth surface, it is usual first to roughen the surface, as by sandblasting or other means, or to apply an intervening layer of roughened stucco, before applying the composition just mentioned. Additionally, in the application of such a material over a rough surface, it is necessary that the surface be first wetted, so that the material is applied to a wetted surface.

My composition can be applied over smooth surfaces, as well as over rough surfaces, because of its high specific adhesion. Also, it is not necessary to wet the surfaces to which my composition is applied. Additionally my material is much easier to apply. The prior art material was much heavier and denser in the form in which it was applied, and additionally settled out rather quickly. It is virtually impossible to apply the prior art material by spraying to the surface of a ceiling, whereas my material may readily be applied to a ceiling by spraying.

As will be seen from what has been said already it is an object of my invention to provide a new and improved decorative surfacing for the interior or exterior walls of buildings, such as houses. A further object is to provide a surfacing composition which can be applied directly over cement blocks, tile or other surfaces and which will obviate the need for using conventional plaster in new construction. A further object is to provide a decorative surfacing composition which, in one operation, will accomplish both the purpose of ordinary plaster and subsequent painting. A further object is to provide a decorative surfacing composition for walls which will set to a firm hard surface within a few hours (and often within an hour or two) and which, in its dried state, has good resistance to abrasion, and a very much higher resistance to abrasion than the prior art mixture of Portland cement, sand, clay and pigments, above mentioned. A further object is to provide a surfacing composition which is economical to make and economical to apply to walls which are to be decoratively surfaced. A related object is to provide a composition which can be applied to walls merely by spraying, without any need for subsequent troweling. These and other objects and advantages will be apparent from the specification as a whole.

In order to specifically illustrate my invention, I will now disclose examples of my wall surfacing composition and how to make the same.

Example 1

| Part A: | Parts by weight |
|---|---|
| Lumnite cement | 30 |
| Asbestine | 50 |
| 7 R Asbestos Fibres | 20 |
| Part B: | |
| Butadiene - styrene copolymer latex (35% solids) | 60 |
| Water | 100 |

Water is mixed with the blended dry ingredients of part A, e. g. 100 parts of water to 100 parts of said dry ingredients, and then the latex is admixed therewith to form a uniform, sprayable slurry. Spray application of the slurry or surfacing composition is readily accomplished by means of a spray gun having about a quarter-inch opening, such as a DeVilbis MBC gun, said composition being supplied to the gun under suitable super-atmospheric pressure. After mixing, the composition of Example 1 remains sprayable for a substantial period, after which it begins to set up or thicken to a state in which it can no longer be effectively forced through the hose and atomized at the nozzle of the spray gun.

The butadiene-styrene copolymer latex may have component constituents in proportions such as the following:

| | Parts by weight |
|---|---|
| Butadiene | 30 |
| Styrene | 70 |
| Sodium lauryl sulfate ("Duponol ME") | 2 |
| Sodium salt of a condensed aromatic sulfonic acid ("Triton R-100") | 1 |
| Tert-dodecyl mercaptan | 0.3 |
| Potassium persulfate | 0.3 |
| Trisodium phosphate | 0.35 |
| Water | 180 |

In preparing the latex, the ingredients are combined in the form of an emulsion, and polymerization is carried out at 50° C. until a sample dried to constant weight at 105° C. shows a non-volatile content of 35%. This is equivalent to approximately 95% conversion of monomers to polymer.

The combination of diluted butadiene-styrene latex as described under part B with the dry ingredients of part A of Example 1, provides a surfacing composition which soon sets up and is no longer sprayable. Furthermore, the coating has a tendency to become dark or mottled in appearance. I therefore prefer to alter Example 1 as shown above, by adding to the latex, prior to incorporation with the dry components of the surfacing composition, additional stabilizers and thickeners. Thus I may add from 3 to 12 percent, based on the dry weight of the butadiene-styrene copolymer, of "Triton R-100" as a stabilizer, up to 10% of hydroxyethyl starch dextrin as a thickener, and up to 1% of diammonium phosphate as an auxiliary stabilizer (reducing the amount of "Triton R-100" stabilizer needed) to the 60 parts of latex hereinbefore noted as required in part B, before mixing with the dry ingredients of part A. Such a composition remains effectively sprayable for at least about 4 hours. In a typical formula, I employ 3% "Triton R-100," 8% hydroxyethyl starch dextrin, and 1% diammonium phosphate. The resulting surfacing composition remains sprayable for 4-6 hours after mixing, and on application by spraying, hardens to a uniform, light-colored coating. Practical conditions of application and use require that such a composition remain stable for application over a period of at least about 3 or 4 hours.

In the above formula, the additional stabilizers and thickeners were added to the liquid components of the mix. They may equally well be incorporated with the dry powder of part A, and when so added remain effective indefinitely.

Where I have specified 60 parts of the latex of part B to 100 parts of the dry mixture (30 parts of hydraulic-setting cement and 70 parts of filler) of part A in Example 1, I may employ as little as 40 parts or even 30 parts of the latex, with good results in terms of stability, adhesion, appearance, and hardness of coating. These amounts are based on the particular mixture of hydraulic-setting cement and fillers of Example 1; where other cements or other fillers are used, and particularly where the fillers are of specific gravity different from those here specified, the proportions of latex may, if desired, show some variations from these values, but the values given cover the practical ingredients known to me. Ordinarily, the amount of latex is to be kept at the minimum consistent with required properties in the surface coating, in order to avoid unnecessary expense. However where less expensive latices or dispersions are employed, the proportion of the latex to the other ingredients is less restricted. In general, for my purposes I have found that the latex or dispersion should be present in an amount such that the weight of non-volatile components thereof is approximately 10-25 to 30%, and usually 10-20%, or slightly higher, of the combined weight of the hydraulic-setting cement and filler.

The amount of water required to be added will depend on the amount of water added as a component of the latex or in other ways. Ordinarily, a portion of water is first added and mixed in; then the latex is mixed in; and finally additional water is added until a sprayable consistency is reached. The quantities here listed have produced sprayable and non-sagging compositions with the formulas indicated.

Another suitable example of my wall surfacing composition is as follows:

*Example 2*

Part A: Parts by weight
| | |
|---|---|
| White Portland cement | 30 |
| Asbestine | 30 |
| Asbestos 7-R | 40 |

Part B:
| | |
|---|---|
| Isoprene-styrene copolymer latex (35% solids) | 40 |
| Water | 125 |

There was also included 6% of "Triton R-100," 9% of hydroxyethyl starch dextrin, and 0.5% of sodium tetraphosphate, percentages being based on weight of the copolymer as 100%. The "Triton R-100" and hydroxyethyl starch dextrin were each added in the form of 20% aqueous solutions in portions of the water specified under part B. The sodium tetraphosphate was added as a dry powder to part A. The freshly prepared mixture of parts A and B, with these additions, remained sprayable for 5 hours, and when applied to wall surfaces formed an adherent, non-sagging coating which set up to a hard and strong light-colored finish.

Whereas in Example 1 there was added a proportion of diammonium phosphate as an auxiliary stabilizing component, the presence of free lime in the Portland cement of Example 2 precludes the use of this material. I have found sodium tetraphosphate to be more suitable for this purpose in conjunction with hydraulic-setting cements containing substantial percentages of free lime. However, the phosphate component may in many cases be eliminated, particularly where the amount of other stabilizer is increased. For example, a formulation according to Example 1 and containing 7-8% added "Triton R-100" and 8% hydroxyethyl starch dextrin was equally as stable as one in which the added stabilizers consisted of 3% "Triton R-100," 8% hydroxyethyl starch dextrin, and 1% diammonium phosphate.

A sodium salt of a condensed aromatic sulfonic acid (such as the sodium salt of a reaction product of beta-naphthalene sulfonic acid and formaldehyde), e. g. "Triton R-100" (a product of Rohm & Haas, Philadelphia) is a preferred example of a material which stabilizes the latex and the surface-coating composition. It is a well-known dispersing agent for mineral fillers. Another similar material which has been found equally effective is the sodium salt of condensed alkyl aryl sulfonic acid, e. g. "Daxad 11" (a product of Dewey and Almy Chemical Company, Cambridge, Mass.). Other equivalent stabilizers may be substituted.

Hydroxyethyl starch dextrin, prepared from alkaline starch dextrin and ethylene oxide at 40° C. under pressure, provides an increase in body of the surfacing composition and appears to prevent migration of colored components to the surface of the coating during hardening. The resulting surface is light in color and uniform in appearance.

Among substitutes for the hydroxyethyl starch dextrin, hydroxyethyl cellulose and sodium carboxymethyl cellulose are examples of other suitable water-soluble thickeners. Where appearance is of secondary importance, the hydroxyethyl starch dextrin or equivalent water-soluble thickener may be omitted if desired.

The latex of Example 2 may be prepared of the following components in the proportions indicated:

| | Parts by weight |
|---|---|
| Isoprene | 30 |
| Styrene | 70 |
| "Duponol ME" | 2 |
| "Triton R-100" | 1 |
| Potassium persulfate | 0.3 |
| Trisodium phosphate | 0.35 |
| Tert-dodecyl mercaptan | 0.15 |
| Water | 180 |
| Short stopper (phenylethanolamine) | 0.2 |
| Antioxidant ("Santovar," alkylated polyhydroxy phenol) | 1–2 |

The emulsified monomer mixture is polymerized at 55° C. to 95% conversion. The short stopper and antioxidant are then added and the latex is cooled. The solids content is approximately 35%.

Another latex which has given good results, particularly with formulations such as part A of Example 1, is a commercial product known as "Saran F-122 A-20 Latex," which is a copolymer of vinylidene chloride with a minor proportion of acrylonitrile, in latex form. With 100 parts of the dry mix, there is required 30 parts of the "Saran" latex and 100 parts of water, to produce a stably sprayable surface-coating composition having high adhesion and providing a hard and well-bonded surface covering.

While the composition of Example 1 provides excellent properties in a number of respects, the coating obtained therewith is inferior to that obtained by using the composition of Example 2 in respect to appearance. Where Example 1 provides a dark and drab surface, Example 2 provides a coating which is white or nearly white. Pigments, e. g. green chrome oxide or red iron oxide, may be added to either composition, but the brightest and cleanest colors are obtained only with light-colored compositions such as that of Example 2.

It will be seen that the dry ingredients of the examples comprise a hydraulic-setting cement, a fibrous filler, and a non-fibrous filler. Where a smooth uniform appearance of the completed coating is desired, a water-soluble thickener is also required. Two examples of hydraulic-setting cement are given; others, e. g. plaster of Paris, will be apparent. It will also be obvious to those skilled in the art that, while certain proportions of cement and filler provide optimum properties of strength and compactness in the hardened coating, yet useful compositions may be provided in which substantially different proportions of these ingredients are employed. Likewise, many other types of fillers may be added to, or substituted for, the specific materials identified in the examples; and their percentage relationships may also be widely varied. A certain percentage of fibrous filler is required in all of my compositions where the wet plaster is to be sprayed over uneven walls or the like, in order to provide bridging qualities as well as other desired properties. At the same time, the amount of fiber must not be so large, nor the fiber length so great, as to cause difficulty in spraying. In general, I find that short-fibered material similar to asbestos of 7–R grade, and in amounts of about from 10 to 50 parts for each 20 parts of hydraulic-setting cement, provide the most desirable compositions, with 15–30 parts being the preferred range.

The designation "7–R" refers to the classification identified at page 93 of "Industrial Minerals and Rocks," first edition, (1937), published by the American Institute of Mining and Metallurgical Engineers, and identifies an asbestos product of which not more than 5 ounces (of a 16-ounce sample) is retained on a 10-mesh screen. Asbestine is a paint-making grade of talc and is, chemically, a magnesium silicate. Mica is another useful form of magnesium silicate; and other inert powdery materials may also be employed. However, the combination of asbestine and short-fiber asbestos, within the approximate ratios herein disclosed, provides a desirable combination of properties and is preferred by me.

The foregoing sufficiently illustrates my wall surfacing composition and the method of producing and using the same. It also sufficiently illustrates the surfaced walls made therewith. No one prior to my invention, insofar as I am aware, ever produced surfaced walls of such nature. Neither did anyone prior to my invention, insofar as I am aware, otherwise accomplish the advantages of my invention as above set forth.

All embodiments within the scope of the present application and the appended claims are comprehended.

What I claim is:

1. A decorative wall surfacing composition which can be applied to walls and ceilings by spray gun application, has sufficient body in the freshly applied wet state so that it will stay in place on smooth vertical wall surfaces, and can be applied by spraying any time during a period of three or four hours after its ingredients are mixed together, said composition consisting mainly of the following ingredients in the proportions by weight of:

| | Parts |
|---|---|
| Hydraulic-setting cement | 30 |
| Inert fibrous and non-fibrous fillers and pigments | 45–90 |
| Hard rubbery copolymer of about 70 parts styrene and about 30 parts diene hydrocarbon copolymerizable therewith, in stabilized latex form | 10–20 |
| Water-soluble thickener selected from the class consisting of hydroxyethyl starch dextrin, hydroxyethyl cellulose and sodium carboxymethyl cellulose | about 1–4 |

And water to provide a sprayable consistency.

said composition, upon application to a wall and drying in situ, providing a wall surfacing having a high specific adhesion to smooth underlying surfaces and a good resistance to abrasion, and presenting a smooth uniform appearance.

2. A decorative wall surfacing composition adapted to be applied to wall and ceilings by spray gun application and which has sufficient body in the wet state so that it will stay in place on smooth vertical wall surfaces and, further, which can be applied by spraying any time during a period of about 3 or 4 hours after its ingredients are mixed together, said composition comprising: about thirty parts by weight of hydraulic-setting cement; about 15-40 parts of inert fibrous filler; about 30-50 parts of non-fibrous inert filler and colored pigment; about 10-20 parts of synthetic polymer from the class consisting of copolymer of about 70 parts styrene with about 30 parts butadiene, copolymer of about 70 parts styrene with about 30 parts of isoprene, and copolymer of vinylidene chloride with a minor proportion of acrylonitrile, said synthetic polymer being in stabilized latex form; about 1-4 parts of water-soluble thickener; and sufficient water to provide a sprayable, non-sagging consistency; said composition, upon application to a wall and drying in situ, providing a wall surfacing having a high specific adhesion to smooth underlying surfaces and a good resistance to abrasion, and presenting a smooth uniform appearance.

GEORGE H. MEAD.

References Cited in the file of this patent

UNITED STATES PATENTS

| Number | Name | Date |
| --- | --- | --- |
| 1,940,528 | Bond | Dec. 19, 1933 |
| 2,227,533 | Cooke | Jan. 7, 1941 |
| 2,427,683 | Ludwig | Sept. 23, 1947 |
| 2,476,306 | King | July 19, 1949 |
| 2,514,637 | Goldstein | July 11, 1950 |
| 2,556,575 | Cubberly et al. | June 12, 1951 |

FOREIGN PATENTS

| Number | Country | Date |
| --- | --- | --- |
| 567,297 | Great Britain | Feb. 7, 1945 |